2,969,339
CHLORINATED TRIGLYCERIDES OF FATTY ACIDS AS SECONDARY PLASTICIZERS FOR POLYVINYL CHLORIDE

Manfred Dohr, Dusseldorf, and Horst-Jürgen Krause, Dusseldorf-Benrath, Germany, assignors to Dehydag, Deutsche Hydrierwerke G.m.b.H., Dusseldorf, Germany, a corporation of Germany No Drawing. Filed June 28, 1957, Ser. No. 668,614
Claims priority, application Germany July 2, 1956
6 Claims. (Cl. 260—23)

This invention relates to plasticizers for vinyl polymers, and more particularly to plasticized polymeric vinyl compositions comprising halogenated fatty acid triglycerides as a plasticizing component.

It is known that chlorinated stearic acid methyl esters with 3 to 6 chlorine atoms in the molecule are useful as plasticizers for polyvinyl chloride. However, in order to obtain satisfactory plasticized products with the aid of such chlorinated stearic acid methyl esters, it is necessary not to permit the chlorine content of the ester to fall substantially below 5 chlorine atoms per ester molecule.

It is an object of the present invention to provide plasticizers for vinyl polymers which produce plasticized compositions with improved physical and chemical properties.

Another object of the present invention is to provide halogenated plasticizers for vinyl polymers wherein the halogen content may be substantially less than the chlorine content in heretofore known chlorinated plasticizers for vinyl polymers without adversely affecting the physical and chemical properties of the plasticized vinyl composition produced therewith.

Other objects and advantages of the present invention will become apparent as the description proceeds.

We have found that halogenated fatty acid triglycerides which have the halogen substituents attached to the carbon chain of the fatty acid radicals may be used with advantage as plasticizers for polyvinyl chloride and its copolymerizates in place of the chlorinated fatty acid methyl esters heretofore used for the same purpose.

The new and unexpected aspect of our discovery is that the number of halogen atoms which must be introduced into each fatty acid radical in order to produce plasticizers which are compatible with polyvinyl chloride or its copolymers is much smaller than in the known chlorinated fatty acid methyl esters.

Moreover, the viscosity-temperature relationship of the halogenated triglycerides used in accordance with the present invention is much more favorable than the viscosity-temperature relationship of the known chlorinated fatty acid methyl esters, which is indicated by the smaller directional constant $m$ (slope) of the viscosity-temperature curve plotted on logarithmic paper. For example, a commercial-grade coconut oil, having a saponification value of 258 and containing from 7 to 10 chlorine atoms per triglyceride molecule—that is, 2 to 3 chlorine atoms per fatty acid radical—is an excellent secondary plasticizer for vinyl polymerizates with a directional constant of 3.4 to 3.6. In contrast thereto, it is necessary to introduce 5 chlorine atoms into the stearic acid methyl ester molecule in order to produce a satisfactory secondary plasticizer for polyvinyl chloride, and even under these conditions the plasticized product exhibits less favorable viscosity-temperature properties, primarily because the directional constant of the viscosity-temperature curve of chlorinated stearic acid methyl esters is about 4.1.

The halogenated triglycerides used as plasticizers in accordance with the present invention produce plasticized vinyl polymer products with greater tensile strength, greater resistance to migration, greater resistance to extraction by solvents and oils and less volatility than plasticized polyvinyl chlorides comprising chlorinated fatty acid methyl esters as secondary plasticizers.

The halogenated triglyceride plasticizers suitable for use in conjunction with the present invention generally comprise mixed fatty acid radicals, especially those which are present in natural fats; that is, mixtures of saturated and/or unsaturated fatty acid radicals with 8 to 20 carbon atoms. The use of halogenated natural fats as plasticizers within the scope of the present invention is of special importance in view of their economy and ready accessibility.

The halogen content of the triglycerides may be varied within wide limits and depends primarily on the length of the carbon chain of the fatty acid radical. Moreover, the chlorine content may also be adapted to a certain degree to the intended use of the plasticizer. A high chlorine content, which may range as high as 6 or more chlorine atoms per fatty acid radical, leads to more viscous products with substantial flame-resistant properties, but, on the other hand, such highly chlorinated products may exhibit a somewhat lesser resistance to low temperatures.

The halogenation of the triglycerides, preferably previously refined triglycerides, is carried out in accordance with known methods accompanied by exposure to light. We have found it to be advantageous to halogenate the triglycerides at temperatures which do not substantially exceed the melting point of the triglyceride. After freeing the halogenated triglyceride from hydrogen chloride in accordance with well-known methods, the halogenated product may be protected against further release of hydrogen chloride by the addition of a stabilizer; for example, by the addition of an epoxidation product of an unsaturated organic compound or other stabilizers customarily used for this purpose.

The halogenated triglyceride plasticizers according to the present invention are primarily useful as secondary plasticizers in compounding plasticized polyvinyl chloride compositions, but they are equally useful for plasticizing mixed vinyl polymers, such as mixtures of polyvinyl chloride with polyvinyl acetate, polyvinylidene chloride, polyvinyl acetals, or the like. Furthermore, other film-forming agents, such as those which have heretofore been used in conjunction with vinyl polymers, may also be added to the polymerizate.

The halogenated triglyceride plasticizers are preferably employed together with known primary plasticizers for the purpose of plasticizing vinyl polymer products; that is, primarily with the known ester plasticizers and polyester plasticizers, such as phthalic acid esters, adipic acid esters or other corresponding polyesters which are commonly used for plasticizing polyvinyl chloride or its co-polymers.

The halogenated triglyceride plasticizers according to the present invention may be used in the production of threads, ribbons, films, foils, plates, blocks and cable sheathings from polyvinyl chloride or polyvinyl chloride mixed polymerizates. The amount of halogenated triglyceride plasticizer added to the vinyl polymerizates depends primarily upon the type and intended physical properties of the finished plasticized product and upon the type of primary plasticizer which is used in conjunction therewith. In general, the amount of halogenated triglyceride plasticizer added to the vinyl polymer may range between about 10 to 40% by weight based on the weight of vinyl polymer, and between about 10 to 120% based on the weight of the primary plasticizer used in conjunction therewith.

The following example will further illustrate the present invention and enable others skilled in the art to understand the invention more completely, but it will be understood that we do not wish to limit the invention to the specific compounds or proportions stated in this example.

EXAMPLE

*Sample 1.*—A refined coconut oil having a saponification value of 258 was chlorinated under customary conditions until the chlorine content was 34.7%, as determined analytically. The sample was admixed with 1% by weight of an epoxidized unsaturated fatty acid ester to stabilize the chlorinated product against further release of hydrogen chloride.

*Sample 2.*—A refined coconut oil was chlorinated under the same conditions as stated in connection with Sample 1 until its chlorine content was about 31.3%, and the chlorinated product was admixed with the stabilizer as above.

*Sample 3.*—A refined coconut oil was chlorinated under the conditions described in connection with Sample 1 until its chlorine content was 28.8%, and the chlorinated product was admixed with the stabilizer as above.

*Sample 4.*—A pentachloro-stearic acid methyl ester was provided as a comparative product.

The specific gravities, viscosities, viscosity-temperature relationships (directional constant $m$) and volatility values of the above four samples were tested and are shown in the following tables:

*Table I*

SPECIFIC WEIGHT AND VISCOSITY-TEMPERATURE RELATIONSHIP

| Sample No. and and Percent Cl | Spec. Wt. | Viscosity in Centipoises | | | | Directional Constant $m$ |
|---|---|---|---|---|---|---|
| | | 20° C. | 40° C. | 60° C. | 80° C. | |
| 1=34.7% | 1.227 | 37,663 | 3,977 | 768 | 217 | 3.65 |
| 2=31.3% | 1.189 | 10,394 | 1,525 | 361 | 121 | 3.56 |
| 3=28.8% | 1.161 | 4,615 | 828 | 225 | 82 | 3.53 |
| 4=38.0% | | 1,170 | 220 | 67 | 27 | 4.1 |

*Table II*

VOLATILITY IN PERCENT LOSS OF WEIGHT AT 90° C. IN BRABENDER PLASTOGRAPH

| Sample | Hours | | | | | | | |
|---|---|---|---|---|---|---|---|---|
| | 1 | 3 | 6 | 24 | 48 | 72 | 96 | 100 |
| 1 | 0.05 | 0.05 | 0.05 | 0.05 | 0.05 | 0.10 | 0.10 | 0.10 |
| 2 | 0.05 | 0.05 | 0.05 | 0.05 | 0.10 | 0.15 | 0.20 | 0.25 |
| 3 | 0.05 | 0.05 | 0.05 | 0.10 | 0.15 | 0.20 | 0.25 | 0.30 |
| 4 | 0.10 | 0.15 | 0.20 | 0.25 | 0.35 | 0.45 | 0.60 | 0.70 |

The above data show that the physical and chemical properties of the halogenated triglyceride plasticitizers used according to the present invention are considerably more desirable than the corresponding properties of the pentachloro-stearic acid methyl ester used as a comparative substance. The improved properties are especially emphasized by the smaller directional constant $m$ of the logarithmic viscosity-temperature curve and by the substantially smaller volatility of the halogenated triglyceride products.

Five plasticized polyvinyl chloride foils were produced on pressure rollers at a temperature of about 165° C., each of said foils consisting of 60 parts by weight polyvinyl chloride and 40 parts by weight of a mixed plasticizer; the plasticizer consisted of 50% by weight of chlorinated fatty acid ester, represented by Samples 1 through 4 above, and 50% dioctyl phthalate. One of the plasticized foils contained 60 parts by weight polyvinyl chloride and 40 parts by weight dioctyl phthalate as the sole plasticizer.

Various properties of these five foils were tested and the results are shown in the following table:

*Table III*

| | Sample 1 | Sample 2 | Sample 3 | Sample 4 | Dioctyl Phthalate |
|---|---|---|---|---|---|
| Tensile value, 100%, kg./cm.² | 109/109 | 104/101 | 96/94 | 78/74 | 50/50 |
| Tensile strength | 209/207 | 207/202 | 187/184 | 178/175 | 151/155 |
| Elongation, percent | 307/313 | 320/317 | 307/305 | 317/327 | 360/360 |
| Shore hardness | 80 | 78 | 76 | 70 | 68 |
| Water absorption, percent | 2.95 | 3.30 | 3.05 | 3.49 | 4.10 |
| Loss in water, percent | 0.11 | 0.10 | 0.10 | 0.05 | 0.14 |
| Loss in oil, percent | 1.22 | 1.25 | 1.60 | 2.95 | 4.20 |
| Loss in gasoline, percent | 11.15 | 14.15 | 18.05 | 20.40 | 27.50 |

The above comparative data show that the halogenated triglyceride plasticizers according to the present invention, when used in conjunction with dioctyl phthalate, impart considerably improved physical values to polyvinyl chloride plasticized therewith as compared to polyvinyl chloride plasticized with pentachloro-stearic acid methyl ester or dioctyl phthalate alone.

While we have illustrated certain specific embodiments of the present invention, it will be apparent to those skilled in the art that the invention is not limited to these embodiments and that various changes and modifications may be made without departing from the spirit of the invention or the scope of the appended claims.

We claim:

1. A composition of matter comprising 60 parts by weight polyvinyl chloride, 20 parts by weight dioctyl phthalate and 20 parts by weight of a triglyceride of a chlorinated high-molecular weight fatty acid derived from refined coconut oil having a chlorine content of about 34.7%.

2. A composition of matter comprising 60 parts by weight polyvinyl chloride, 20 parts by weight dioctyl phthalate and 20 parts by weight of a triglyceride of a chlorinated high-molecular weight fatty acid derived from refined coconut oil having a chlorine content of about 28.8%.

3. A composition of matter comprising 60 parts by weight polyvinyl chloride, 20 parts by weight dioctyl phthalate and 20 parts by weight of a triglyceride of a chlorinated high-molecular weight fatty acid derived from refined coconut oil having a chlorine content of about 31.3%.

4. A composition of matter comprising plasticized polyvinyl chloride and as a secondary plasticizer, from 10 to 40% by weight of the polyvinyl chloride of a triglyceride of a high-molecular-weight fatty acid having from 2 to 6 chlorine atoms attached to each fatty acid radical.

5. The composition of claim 6 wherein said triglyceride contains from 2 to 3 chlorine atoms attached to each fatty acid radical.

6. In the process of rendering compositions containing polyvinyl chloride plastic by mixing said compositions with substantial amounts of a primary plasticizer and from 10 to 120% by weight of the primary plasticizer of a chlorinated fatty acid ester secondary plasticizer, the improvement which comprises mixing as said secondary plasticizer a triglyceride of a high-molecular-weight fatty acid having from 2 to 6 chlorine atoms attached to each fatty acid radical.

References Cited in the file of this patent

UNITED STATES PATENTS

| 1,980,959 | Schultz | Nov. 13, 1934 |
| 2,186,917 | Gaylor | Jan. 9, 1940 |
| 2,255,230 | Ross et al. | Sept. 9, 1941 |
| 2,369,985 | Safford | Feb. 20, 1945 |

FOREIGN PATENTS

| 599,133 | Great Britain | Mar. 5, 1948 |
| 601,114 | Great Britain | Apr. 28, 1948 |

UNITED STATES PATENT OFFICE
CERTIFICATION OF CORRECTION

Patent No. 2,969,339                                January 24, 1961

Manfred Dohr et al.

It is hereby certified that error appears in the above numbered patent requiring correction and that the said Letters Patent should read as corrected below.

Column 4, line 53, for the claim reference numeral "6" read -- 4 --.

Signed and sealed this 18th day of July 1961.

(SEAL)
Attest:

ERNEST W. SWIDER
Attesting Officer

DAVID L. LADD
Commissioner of Patents